US010033245B2

(12) United States Patent
Lee

(10) Patent No.: US 10,033,245 B2
(45) Date of Patent: Jul. 24, 2018

(54) BRUSHLESS DIRECT CURRENT VIBRATIONAL MOTOR

(71) Applicant: YOUNGBAGS CM CO., LTD., Seoul (KR)

(72) Inventor: Sang Eui Lee, Jinju-si (KR)

(73) Assignee: YJM GAMES CO., LTD., Seoul (KR)

( * ) Notice: Subject to any disclaimer, the term of this patent is extended or adjusted under 35 U.S.C. 154(b) by 646 days.

(21) Appl. No.: 14/677,124

(22) Filed: Apr. 2, 2015

(65) Prior Publication Data

US 2015/0288247 A1 Oct. 8, 2015

(30) Foreign Application Priority Data

Apr. 4, 2014 (KR) .................. 10-2014-0040794

(51) Int. Cl.
*H02K 11/00* (2016.01)
*H02K 7/06* (2006.01)
*H02K 7/08* (2006.01)

(52) U.S. Cl.
CPC .............. *H02K 7/061* (2013.01); *H02K 7/063* (2013.01); *H02K 7/08* (2013.01)

(58) Field of Classification Search
CPC .......... H02K 7/061; H02K 7/063; H02K 7/08; F16C 33/20
USPC ... 310/12.16, 51, 80, 81, 14, 15, 17, 25, 26, 310/68 B
See application file for complete search history.

(56) References Cited

U.S. PATENT DOCUMENTS

| 2,427,730 | A * | 9/1947 | Latham, Jr. ............... | F01C 1/04 384/315 |
| 6,417,589 | B1* | 7/2002 | Kuyama ................ | H02K 7/063 310/80 |
| 2002/0173077 | A1* | 11/2002 | Ho ...................... | H01L 23/3114 438/113 |
| 2004/0051400 | A1* | 3/2004 | Yamaguchi ............ | H02K 5/145 310/10 |
| 2004/0084980 | A1* | 5/2004 | Yamaguchi ............ | H02K 7/063 310/81 |

(Continued)

FOREIGN PATENT DOCUMENTS

JP 08-289523 11/1996
JP 2006-166685 6/2006

(Continued)

*Primary Examiner* — Bernard Rojas
*Assistant Examiner* — Ahmed Elnakib
(74) *Attorney, Agent, or Firm* — Roberts Mlotkowski Safran Cole & Calderon P.C.

(57) ABSTRACT

A BLDC vibrational motor is provided, which is improved so as to generate a larger vibrational force per same volume compared to prior arts. A cylindrical bearing is fixed to a doughnut-shaped permanent magnet directly so that the magnet can be disposed as close as possible to the center of rotation, and thus coils can have a reduced volume and be disposed as close as possible to the center of rotation. The external space of the coils can be secured larger as much as the movement of position of the coils, and the weight takes up the space for rotation, so that volume of the weight can be enlarged. Thus, the weight can be extended and disposed to the external space of the coils, it is possible for a vibration motor with a small volume to generate a large vibrational force, which facilitates slim designs of the vibrational motor.

5 Claims, 7 Drawing Sheets

(56) References Cited

U.S. PATENT DOCUMENTS

2007/0040468 A1* 2/2007 Ki ..................... H02K 7/063
310/247

FOREIGN PATENT DOCUMENTS

KR 100489831 6/2003
KR 20040110629 * 12/2004

* cited by examiner

【Figure 1】
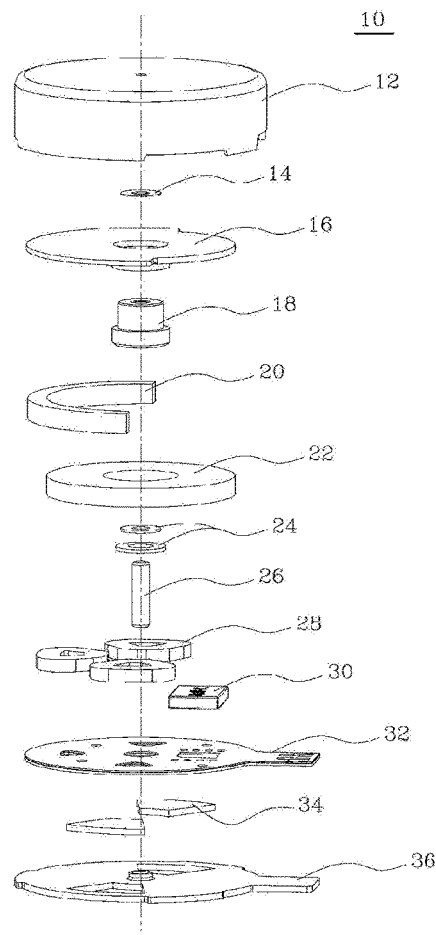
【Figure 2】
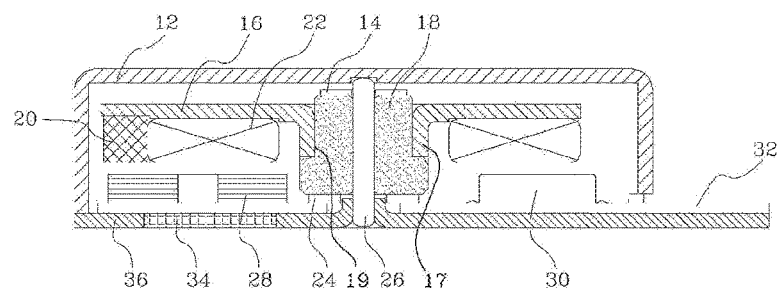

【Figure 3】
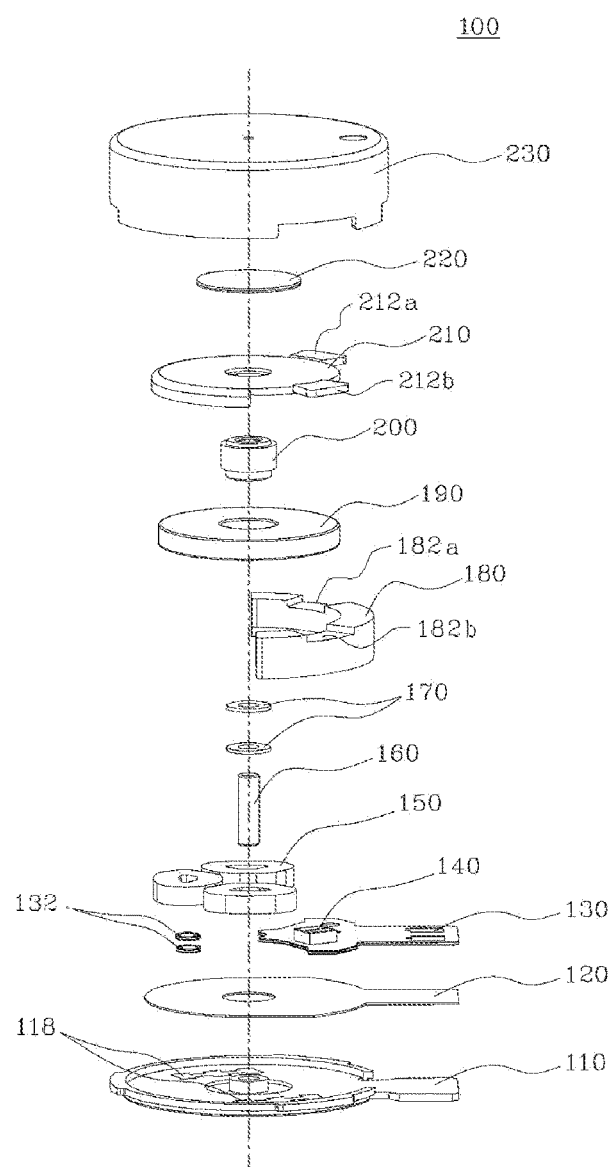

【Figure 4】
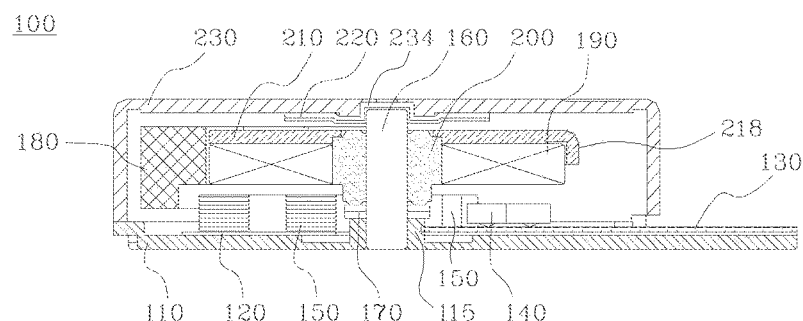
【Figure 5】
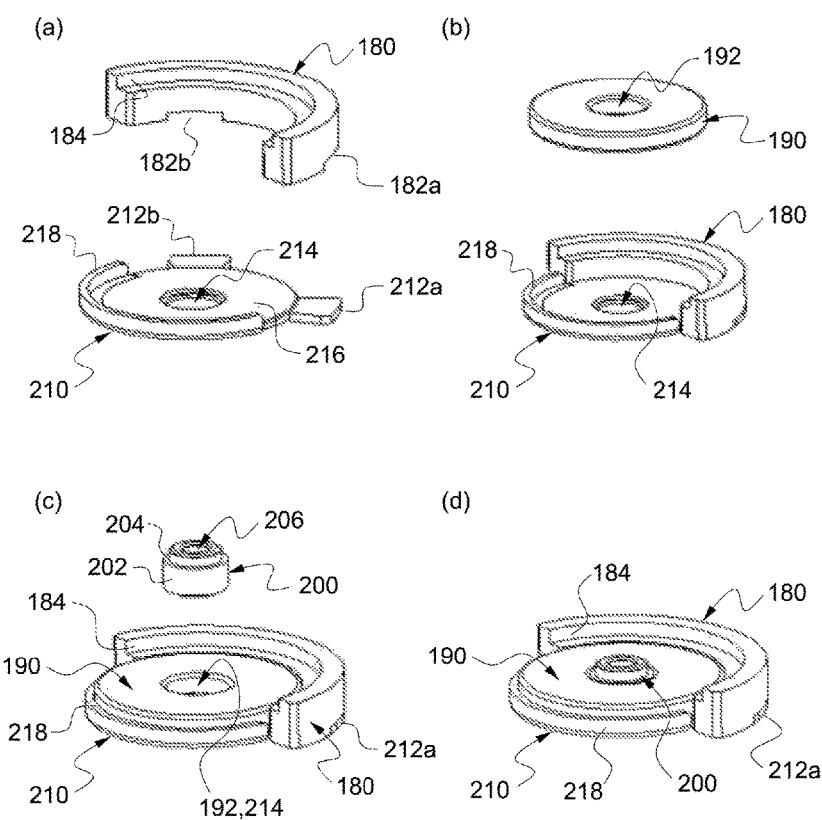

[Figure 6]
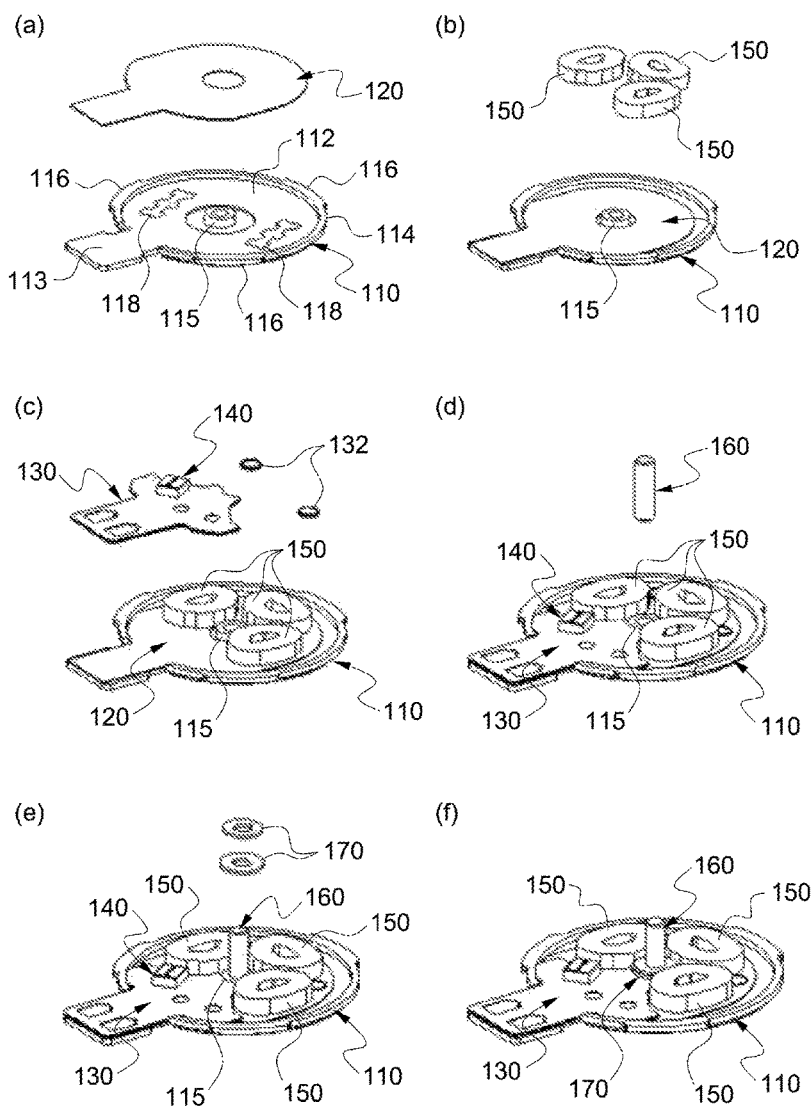

【Figure 7】
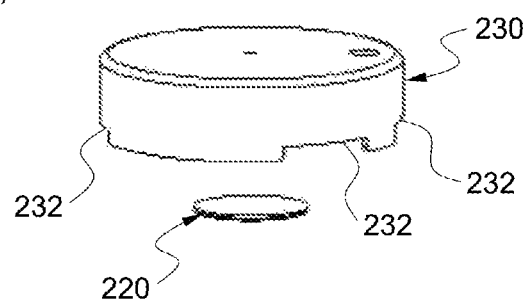
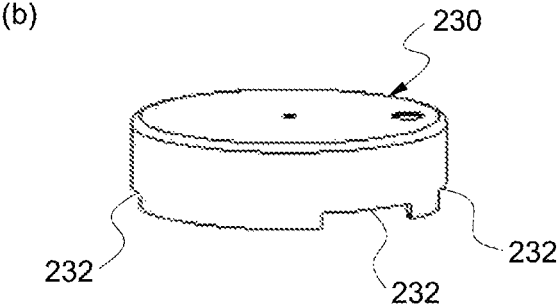

【Figure 8】
(a)
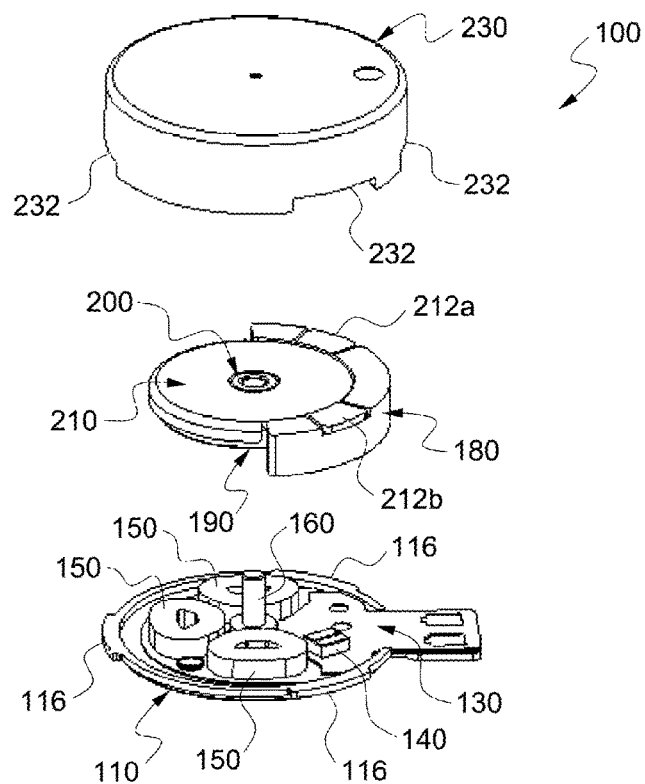
(b)
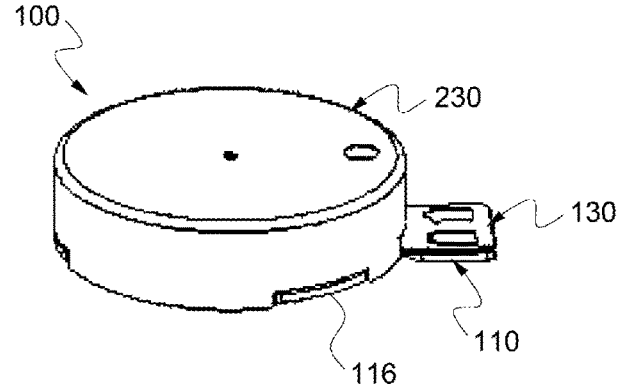

【Figure 9】
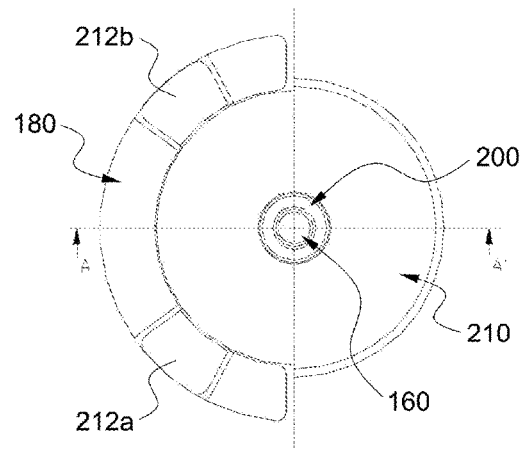
【Figure 10】
(a) Cross-Sectional view along line A-A'
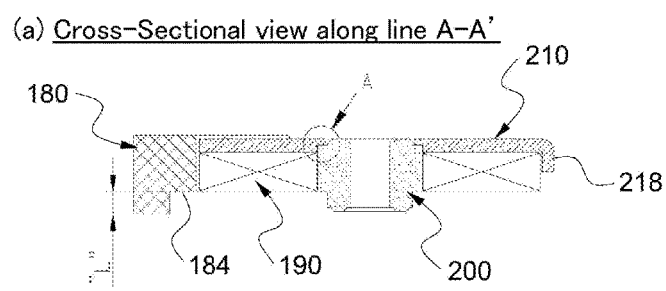
(b) Enlarged view of "A"
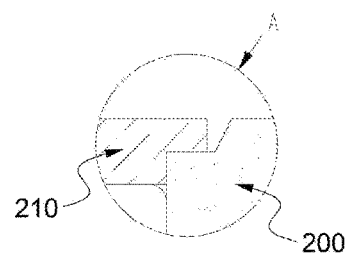

BRUSHLESS DIRECT CURRENT VIBRATIONAL MOTOR

FIELD OF TECHNOLOGY

The invention relates to a brushless direct current (BLDC) vibrational motor, more specifically to a coin-type BLDC vibrational motor, which is installed in a portable electronic device and configured for generating vibration if needed.

BACKGROUND OF THE TECHNOLOGY

For instance, mobile communication terminals such as mobile phone, and pager, etc. and portable game machine use a vibrational motor as a means for informing the user of receiving of signal, occurrence of events, etc.

FIG. 1 is an exploded perspective view showing a structure of a BLDC vibrational motor (10) in a prior art used widely, and FIG. 2 is a cross-sectional view of the BLDC vibrational motor (10). The conventional BLDC vibrational motor (10) has a rotor rotating in high speed during operation, a stator remaining stationary and supporting the rotation of the rotor, and a case receiving them.

The rotor is formed by combining a back yoke (16), a bearing (18), a weight (20), and a magnet (22) into a single body. In order to shield magnetic field of the magnet (22), the bearing (18) is pressed forcefully in the back yoke (16). Inside the back yoke (16) is attached the magnet (22). Outside or on the top of the magnet (22) is attached the weight (20) made of material having a high density such as tungsten, making the center of mass of the rotor eccentric.

The stator has a PCB (32), an operating IC (30), a coil (28), and a shaft (26). In order to increase rotational torque and an operational performance of starting of the rotor, the rotor needs to be stopped in a certain segment. For that, in a bracket (36) of the stator is installed a cogging plate (34) for generating cogging torque. At a center of the bracket (36) where the cogging plate (34) is installed is provided a through-hole. In the through-hole is inserted and fixed the shaft (26). On the PCB (32) having a shaft through-hole provided in the center are installed one or more coils (28) (preferably, 2~4 coils) for generating electrical force and the operating IC (30). The stator is completed by inserting the PCB (32) into the shaft (26) and attaching on the inner top portion of the bracket (36) with glue.

Assembling of the rotor with respect to the stator is done by inserting a central bearing (18) of the rotor around the shaft (26) of the stator. By inserting washers (24) on top and bottom portions of the shaft (26) after assembling, the rotor is limited to rotate within a certain height range. A top case (12) for protecting components inside is assembled with the bracket (36). Here, in order to prevent friction noise during rotation, a sliding film or washer (14) is inserted inside the top case (12).

The operating IC (30) has a Hall sensor, and supplies a current to a corresponding coil (28) using signals generated by the Hall sensor. The PCB (32) attached to the bracket (36) is installed extended up to the outside of the motor, so as to make it easy to connect a power source externally. If the external power is supplied to the PCB (32), current is supplied to the coils (28) installed inside through the operating IC (30) with the Hall sensor embedded. Each of the coils (28) flowing current forms a magnetic field, and interacts with the magnetic field of the rotor magnet (22), generating attracting and repelling forces, and thus rotating the rotor. Here, due to the eccentric center of mass by the weight (20), the rotor shakes and rotates, thus generating vibrations.

Recent mobile phones adopt a touch screen, enabling thin smart phones. With smart phone's thickness getting smaller, the components are under pressure to be made smaller and slimmer accordingly. The vibrational motor is not an exception, and its thickness is required to be thinner but the vibrational power is required to be larger. In the case of conventional BLDC vibrational motor (10), it is unavoidable to reduce the volume of rotor for getting smaller and slimmer. Since the weight (20) is to be disposed outside or over the magnet (22), it is also unavoidable to reduce the size of the weight (20) as those of other components. As the volume of the weight (20) is reduced, the eccentricity amount in rotation is reduced, resulting in reducing the vibrational force accordingly. Like this, the conventional BLDC vibrational motor (10) has a structural flaw of the vibrational force reduced along with its reduced size and/or thickness.

Also, in order to provide a structure that the bearing (18) supports the back yoke (16) in the conventional BLDC vibrational motor (10), a step (19) is provided on an exterior side surface by a difference of thickness in a cylindrical body of the bearing (18), and a bearing support (17) is provided at a center of the yoke (16). The bearing support (17) is inserted forcibly around a cylindrical body of the thin portion forming the step (19) of the bearing, by which the yoke (16) can engage with the bearing.

Since the bearing support (17) takes up some of the thickness in a radial direction in the structure that the bearing support (17) is provided in the back yoke (16), there is a limit to reducing the inner diameter of the magnet (22), compared to a structure in which the bearing support (17) is not provided. If the inner diameter of the magnet (22) gets larger, there is a limit to reducing its exterior diameter. For the magnet (22) has to be lager in size than the minimum size for generating the required magnetic flux. If the stator's coil (28) gets off from a region straightly below the magnet (22) and is disposed toward a center of the vibrational motor (10), that is, a little closer to the shaft (26) in such a structure, the magnetic flux interlinkage between the coil (28) and the magnet (22) gets reduced, which results in decrease of the magnetic force. That is, the coil (28) must be disposed right below the magnet (22), maximizing the overlapped area between them (the effective area of the coil (28) per unit area of the magnet (22) must be maximized) and then generating a maximum vibrational force. However, the conventional vibrational motor (10) has a disadvantageous structure in that if the motor (10) is designed so, it becomes very hard to reduce its size and thickness. In other words, if considering the magnetic force between the magnet (22) and the coil (28), the dimension of the magnet (22) is hard to reduce or the magnet is hard to move toward the central axis of rotation. Since the coil (28) must be disposed according to the position of the magnet (22), it is hard to reduce the size of coil (28) and dispose it toward the central axis.

Also, it is hard to minimize the size of operating IC with the conventional chip package type. In the chip package type, the operating IC chip is attached to the bottom surface of lead frame by die bonding, a wire bonding is done between terminal portions of the lead frame and aluminum pad portion of the IC chip, and the final product is obtained after a series of assembling processes such as plastic molding, trimming, etc. In such IC package type, the overall package size cannot help getting larger than the size of the IC chip. Since conventional BLDC vibrational motor uses an operating IC chip manufactured by such a wire bonding package type, it hinders reducing the entire size of vibrational motor. An improvement is needed to the package type of operating IC chip.

DETAILED DESCRIPTION

Problems to Solve

The invention is for improving the shortcomings of the conventional BLDC vibrational motor as in the above. Therefore, it is an object of the present invention to provide a BLDC vibrational motor, which has a structure of smaller size and thickness than the conventional BLDC vibrational motor, but does not require the reduction of the volume of weight and coils, enabling generation of a strong vibrational force.

Solutions to Problems

The present invention is based on technological ideas that if the coil is moved as much as toward the central inner side of the stator, the inner and outer diameters of the magnet must be reduced accordingly so as to maximize an efficiency of the electromagnetic force between the magnet and the coil in order to solve problems of conventional vibrational motors. In order to make the coil and operating IC disposed in the stator be disposed much closer to the center of the stator and at the same time the magnetic flux generated by the stator magnet interlinks with the coil maximally so as to generate maximum electromagnetic force, the present invention is based on the fact that it needs to modify the structure which does not provide a bearing support in the back yoke separately. Also, the inventor comes to know that since a method of fixing directly the oil-less bearing of iron series having over 70% of iron to the magnet for shielding some of the magnetic field of the magnet interlinking with the rotational axis (shaft) can reduce the inner diameter of the magnet and the outer diameter of the magnet can be reduced as much as the inner diameter, the method has an advantage that the volume of the weight can be enlarged as much. Thus, since it is possible to obtain an external space of the coil, the amount of eccentricity of the stator can be maximized by increasing the volume of the weight so that the weight can take up the external space of the coil.

Based on the above points, according to an embodiment of the present invention for accomplishing the above goals, a brushless direct current (BLDC) vibrational motor comprises: a stator comprising: a bracket providing a circular floor plate having a circular protruding supporting portion provided at a center; a shaft having a lower portion press-fitted in and fixed to the circular protruding supporting portion; double-sided tape attached to the circular floor plate of the bracket; a plurality of coils attached and fixed on the double-sided tape and disposed closely around the shaft; and a printed circuit board installed with an operating IC having a Hall sensor, supplying operating current to the plurality of coils so as to make electromagnet, and attached and fixed on the double-sided tape, wherein the stator is fixed so as not to rotate; a rotor comprising: a back yoke providing a circular plate having a through-hole at a center; a doughnut-shaped permanent magnet engaging with the circular plate of the back yoke solidly, positioned right above the plurality of coils, interacting with magnetic fields generated by the plurality of coils, and generating a rotational torque; a cylindrical bearing press-fitted in the inside of the permanent magnet to be engaged directly so as to minimize the outer diameter of the permanent magnet, and having a top portion inserted in the through-hole of the back yoke; and a weight being a circular-arc-shaped bar, engaging solidly with an edge portion of the circular plate of the back yoke, extending downward so as to enclose closely an outside of the circular plate of the back yoke, an outside of the permanent magnet, and an outside of the coils, having a step on a bottom of the weight, having a structure for enabling enclosing the outside of the coils up to the height of the step so as to enlarge the volume of the weight more by the volume amount of the step, thereby increasing eccentric vibration, and made of material of high density, wherein the bearing is inserted around the shaft and thus the rotor engages with the stator so as to rotate about the shaft as a central axis, and all of the back yoke, the permanent magnet, the bearing, and the weight vibrate and rotate integrally by the rotational torque generated by the permanent magnet and the eccentricity of the weight; and a case receiving an assembly of the stator and the rotor in an internal space provided by covering and engaging with the bracket and having a top end of the shaft inserted in a groove provided at a center thereof so as to hold the shaft stably.

In the above brushless direct current (BLDC) vibrational motor, preferably the bearing is an oil-less bearing made of iron series having over 70% of iron, so that the bearing can shield flux of magnetic field from the permanent magnet from entering the shaft and thus block magnetic field interference.

In the above BLDC vibrational motor, in order to prevent the bearing from dislocating from a top of the rotor, preferably a step is provided in each of the through-hole at the center of the back yoke and the top surface of the bearing, so that the back yoke engages with the bearing in a form that the step border of the through-hole of the back yoke covers and presses down on the top end edge of the bearing.

In the above BLDC vibrational motor, preferably the weight is formed with at least one latching groove on the top surface, the back yoke is provided with at least one latching protrusion extending radially from the edge of the circular plate, and the at least one latching protrusion of the back yoke is inserted to the at least one latching groove of the weight to engage solidly, thereby maintaining the engagement between the weight and the back yoke even when the rotor rotates in high angular speeds, and so that a portion of the top surface of the weight has at least the same height as the circular plate of the back yoke.

In the above BLDC vibrational motor, preferably the back yoke comprises an arc-shaped latching step, which is provided in a specific height along a portion of the edge of the circular plate, enclosing an external surface of the permanent magnet, so that when the rotor rotates in high angular speeds the permanent magnet is supported and prevented from dislocating radially by the arc-shaped latching step.

In the above BLDC vibrational motor, preferably the weight is an arc-shaped bar having a step on a bottom surface thereof and enclosing the outside of the coils as high as the step, so as to enlarge the volume of the weight as much as the portion forming the step and increase the eccentric momentum.

The above BLDC vibrational motor preferably further comprises a washer, which is inserted around a bottom portion of the shaft, supported by the cylindrical protruding supporting portion of the bracket, supporting the bearing lest the bearing be lowered below a specific height.

In the above BLDC vibrational motor, preferably the bearing is combined to the back yoke so that the height of the top surface of the bearing can be maintained at the same height as or lower than the surface height of the back yoke.

Also, in the above BLDC vibrational motor, preferably a diameter of a portion of the bearing facing the plurality of coils is smaller than a diameter of a portion of the bearing engaging with the permanent magnet, so that the plurality of coils are disposed closer to the shaft.

Preferably, the operating IC is packaged with a technology of a wafer level chip scale package (WLCSP) forming a bump terminal at an IC bare chip, so that an area of the IC chip is the same as an area of the entire package.

Effects of Invention

The vibrational motor improved by the present invention is able to generate at least 20% larger vibration, compared to conventional vibrational motors of the same volume. Also, there is no distinct limitation to increasing or decreasing of the size of the weight. Since the mass of the weight can be changed by varying the size of the weight, it is easy to decrease or increase the amount of vibration.

BRIEF DESCRIPTION OF DRAWINGS

FIG. 1 is an exploded perspective view showing a BLDC vibrational motor of a prior art;

FIG. 2 is a cross-sectional view of the BLDC vibrational motor of a prior art;

FIG. 3 is an exploded perspective view showing a BLDC vibrational motor according to a preferable embodiment of the present invention;

FIG. 4 is a cross-sectional view of the BLDC vibrational motor according to the preferable embodiment of the present invention;

FIGS. 5 and 6 are a plan view and a cross-sectional view of the BLDC vibrational motor according to the preferable embodiment of the present invention;

FIGS. 7 to 10 illustrate assembling orders of the BLDC motor according to the preferable embodiment of the present invention, wherein FIG. 7 illustrates an assembling order of a case assembly;

FIG. 8 illustrates an assembling order of a rotor assembly;

FIG. 9 illustrates an assembling order of a stator assembly; and

FIG. 10 illustrates an assembling order of a final product of a BLDC vibrational motor.

DETAILED DESCRIPTION OF EMBODIMENTS OF INVENTION

Hereinafter, referring to the attached drawings, embodiments of the invention are described in detail.

FIG. 3 and FIG. 4 are an exploded perspective view and a cross-sectional view of a BLDC vibrational motor (100) according to a preferable embodiment of the present invention, respectively. The BLDC vibrational motor (100) includes a case, a stator, and a rotor. After assembling each of the rotor and the stator separately, they are assembled, and then received in the case, completing the BLDC vibrational motor (100). FIGS. 5 to 8 show the assembling order and method of the BLDC vibrational motor (100).

First, referring to FIG. 5, the structure and assembling procedure of the rotor are described. A weight (180) is an arc-shaped bar, and in order to provide a large eccentricity it is made of material of high density. On a top surface of the weight (180) are formed two spaced-apart latching grooves (182a, 182b), and on a bottom surface is provided a step (184). The latching groove can be formed by one or more than three.

A back yoke (210) has a structure including a circular plate (216) provided with a through-hole (214) at a center, an arc-shaped latching step (218) provided to have a specific height of step by bending approximately perpendicularly along about half of the edge the circular plate (216), and at least one latching protrusion (two latching protrusions (212a, 212b) are shown in the drawings) extending radially (in a horizontal direction) from the remaining half of the edge of the circular plate (216) with a specific interval from each other. The back yoke (210) shields the magnetic flux generated by a magnet (190) made of a permanent magnet so as not to leak, and performs a function of holding or fixing components of the rotor.

In the two latching grooves (182a, 182b) of the weight (180) are inserted the two latching protrusions (210a, 210b) of the back yoke (210), engaging each other while interlocking. By this, the weight (180) and the back yoke (210) engage with each other (refer to FIG. 5(a) and (b)). They can engage through glue or welding. Since this assembly rotates in high angular speeds, they need to be engaged very solidly, preferably a laser welding may be preferable.

According to a structure of the assembly of the weight (180) and the back yoke (210), about half of the edge of the back yoke (210) is enclosed by the arc-shaped latching step (218), and the remaining half is enclosed by the weight (180). In the circular space enclosed by the arc-shaped latching step (218) and the weight (180), the doughnut-shaped magnet (190) having a through-hole (192) at the center is received and engaged (refer to FIG. 5(b) and (c)). This permanent (190) is a permanent magnet having several north magnetic poles and several south magnetic poles that are arranged alternately along the circumferential direction of the magnet. This magnet (190) and the back yoke (210) are joined together through super glue. The through-hole (192) of the magnet (190) and through-hole of the back yoke (210) are aligned through their centers.

In such a state, the bearing (200) is press-fitted in the through-hole (192) of the magnet (190) forcefully, being fixed thereto (refer to FIG. 5(c) and (d)). By this, it is finished to assemble the rotor. The bearing (200) has a shape of tube or cylinder having a through hole penetrating the center thereof, and a circular step is provided on the external surface of the bearing (200) by making the diameter at the bottom portion larger than the top portion of the body (202). It is advantageous to dispose the coils (150) much closer to the rotational axis due to the body bottom portion (204) of the bearing (200). The body top portion of the bearing (200) gets engaged with the back yoke (210) solidly, which contribute to preventing the BLDC vibrational motor (100) from dislocating of the bearing (200) in a vertical direction by an external shock (described in more detail later). This rotor, since the magnet (190) and the back yoke (210) engage with each other with the bearing (200) as a center and the weight (180) engages with a portion of the arc section of the edge of the back yoke (210), is an assembly assembled solidly so as to be able to rotate as a single body, which is formed by the entirety.

Containing oil by having been immersed in oil, the bearing (200) makes rotation of the rotor smooth. It is preferable to use a metal bearing. The metal bearing includes iron series and copper series of bearings usually (the distinction between iron series and copper series depends on which of iron and copper being contained more). Since there is no bearing supporting portion (17) in the conventional vibrational motor (10), if the copper series bearing is used, the magnetic force of the magnet (190) is attracted to the shaft (160) of the stator, resulting in an interfering phenomenon. In order to minimize such interference, the number of magnetic field lines from the magnet (190) interlinking with the shaft (160) needs to be minimized. That is possible to increase the amount of iron in the bearing (200) to the maximum.

Next, referring to FIG. 6, the structure and assembling procedure of the stator are described.

The bracket (110) fixes the components of the stator and performs a function of stopper for stopping the rotor at the starting position. For such functions, the bracket (110) has a structure comprising a circular floor surface (112), an entrance surface (113) extending horizontally from a certain section of the edge, a side wall (114) provided at a low height by bending vertically upward from the edge of the circular floor surface (112), engaging protrusions (116) protruding a little radially from a plurality of sections of the side wall (114), and a circular supporting portion (115) protruding vertically from a center of the circular floor surface (112). The bracket (110) is preferably made of non-magnetic material, for example, SUS.

And on the circular floor surface (112) of the bracket (110), at two points opposing each other with respect to the circular supporting portion (115) as a center, is fixed a cogging plate (118). The cogging plate (118) is made of magnetic material (SPC series), performing a function of holding so that the rotor stops at a constant phase angle all the time.

A double-sided tape (120) are provided, which has the same shape as the circular floor surface (112) and the entrance surface (113) of the bracket (110), however, so that the circular supporting portion (115) is exposed. The double-sided tape (120) is attached to the circular floor surface (112) and the entrance surface (113) (refer to FIGS. 6(a) and (ab)).

On the double-sided tape (120) are attached three coils (150), but as close as possible to the circular supporting portion (115) (refer to FIGS. 6(b) and (c)).

And on the remaining area of the double-sided tape (120) other than the area where the three coils (150) are attached are attached the PCBs (130, 132). The double-sided tape (120) fixes the coils (150) and the PCBs (130, 132) to the bracket (110). In the PCB (130) is installed the operating IC (140). In the operating IC (140) is embedded a magnet Hall sensor (refer to FIGS. 6(c) and (d)). Also, one of the two small PCBs (132) is installed between first and second coils (150), the ending wires of the coils are connected each other by soldering. Also, the other PCB (132) is installed between second and third coils (150), and the starting wires of the coils are connected by soldering. The ending wires of the first and third coils are connected to two terminals of the PCB (130) by soldering, and then connected to the operating IC (140).

In order to reduce the size of the operating IC, the present invention, unlike the prior arts, uses a wafer level chip scale package (WLCSP) technology. This technology is a packaging technology forming a bump terminal at the IC bare chip, in which the area of the IC chip itself is the same as the area of the entire package. An IC chip according to this technology can reduce the installation area by over 50% compared to the conventional wire bonding type, facilitating slim and light designs of BLDC vibrational motor (100).

After attaching the PCB (130), the coils (150) are connected to the PCB (130) by soldering. And the shaft playing the role of rotational axis of the rotor is press-fitted in the circular supporting portion (115) (refer to FIGS. 6(d) and (e)).

A washer (170) is inserted and fixed to the shaft (160) (refer to FIGS. 6(e) and (f)). This washer (170) plays the role of a stopper for preventing the rotor from getting lowered below a specific height.

Through these procedures, the stator is assembled.

FIG. 7 shows a case assembly. A case body (230) has a shape of overturned container, and includes a circular ceiling and side wall bent vertically from a circular edge. And at top ends of the side wall are provided a plurality of latching grooves (232). The case body (230) covers the bracket (110) and receives the assembly of stator and rotor in an inner space provided by engaging the bracket (110). The case body (230) shields magnetic flux so as not to leak out and at the same time protects components inside. At an inner center of the ceiling of the case body (230) is provided a groove (234). It is preferable to attach a sliding film (220) on and around the groove (234) for preventing noise. The sliding film (220) facilitates sliding for rotation in contact of the bearing (200), and reduces noise from rotation. A top end of the shaft (160) is inserted in the groove (234). By this, the shaft (160) is held solidly and supported by the bracket (110) and the case body (230), performing a function as a rotational axis of the rotor.

Once the rotor, the stator, and the case assembly are ready, the assembly of the BLDC vibrational motor (100) is completed by receiving the rotor and the stator in the receiving space. Referring to FIG. 8, it is describe in more detail. While the magnet (190) is pointed downward, the shaft (160) is inserted in the bearing (200), assembling the stator and the rotor. The assembly of stator and rotor assembled as such is covered by the case body (230). There, it is covered so that the engaging protrusions (116) of the bracket (110) interlock with the plurality of latching grooves (232) of the case body (230). And, the parts where the case body (230) and the bracket (110) contact each other are welded by laser, engaging solidly. By this, the assembly of BLDC vibrational motor (100) is completed.

On the other hand, the operation principles of the BLDC vibrational motor (100) are described. The PCB (130) is connected to an external power source, receives electric power, and delivers it to the operating IC (140). The operating IC (140) supplies operating current alternatively to the coils (150) by sensing polarity of magnet using the Hall sensor built therein. By this, while the operating current flows through the coils (150), each coil (150) generates a magnetic field. Along with this, the magnet (190) made of a permanent magnet generates magnetic fields all the time, and the flux of the magnetic fields interlinks with the coils (150). The magnetic field generated by each coil (150) interacts with the magnetic fields formed by the magnet (190), producing attracting forces or repelling forces, generating torque on the magnet (190). That is, the magnetic fields generated by each coil (150) and the magnetic fields generated by the magnet (190) interact, generating rotation of the magnet (190), so that the entire rotor that is integrated with the magnet (190) rotates in high angular speeds about the shaft (160) as a center. Then, since the weight (180) provides an eccentricity to the entire rotor, the rotor rotates in a high angular speed, generating vibration.

The BLDC vibrational motor (100) according to the invention has a structure that can be made smaller and still produces vibration that is strong enough. The invention does not provide bearing support (17) in the back yoke (210), which was provided with the back yoke (16) of the conventional vibrational motor (10), in order to reduce the size in a radial direction of the BLDC vibrational motor (100). Since there is no bearing support (17), the size can be reduced radially as much as it took up before, and therefore the size from the center of the shaft (160) to the side surface of the bearing (200) can be minimized. As the radial size is reduced, the coil (150) and the operating IC (140) forming the stator can approach toward the shaft (160) that is an axis of the stator to be disposed as close as possible to the shaft (160). If the positions of the coils (150) are moved toward the central portion of the stator as such, the inner and outer diameters of the magnet (190) must be reduced in order to maximize the magnetic flux interlinking with the coils (150). As the size of the magnet (190) is reduced radially, more space is secured between the case body (230) and the magnet (190). This means that in a case of keeping the size of the weight (180) as before, the radial size of the case body (230) can be reduced. That is, the radial size of the vibrational motor (100) can be reduced. Also, if reducing the degree of miniaturization of the radial size, the radial size of the weight (180) can be made larger.

However, in the conventional vibrational motor (10), since the shaft (26) has material with iron, the interference by attracting of the shaft (26) through the magnetic force of the magnet (22) may occur. If such interference happens, the number of rotation of the vibrational motor (10) falls down and current goes up, lowering the energy efficiency. The conventional vibrational motor (10) provides a bearing guide (17) in the back yoke (16) in order to prevent such problems. Since the bearing guide (17) exists between the magnet (22) and the bearing (18) and the shaft (26), the magnetic fields generated by the magnet (22) and pointing to the bearing (18) and the shaft (26) could be shielded and thus the interference phenomenon between the magnet (22) and the shaft (26) could be prevented.

In contrast, in the case of the present invention, in order to make the vibrational motor (100) small-sized and slimmer, a component such as a bearing guide (17) is not provided in the back yoke (210). Instead, by using an iron series bearing having very high ratio of iron as the bearing (200), it is designed so as to shield the magnetic field lines which cause interference with the shaft (160).

More specifically, the kinds of bearings, depend on the main ingredient thereof, can be classified as copper series bearing and iron series bearing. The first one's main ingredient is copper and the second one's is iron. If using the copper series bearing in the vibrational motor (100) of the invention, as discussed in the above, the magnetic force of the magnet (190) interferes with the shaft (160) that is a central axis of the stator. Such interference causes reduction in the magnetic flux of the magnet (190) that contributes to generating torque of the rotor. In order to prevent such interference as much as possible, it is preferable to use the iron series bearing having high ratio of iron for the bearing (200). The iron series bearing shields the magnetic field lines from the magnet (190) from entering the shaft (160) that is the central axis of the stator, maximizing the magnetic flux contributing to generating rotation.

Considering these points, in the invention, for the stator, iron series oil-less bearing (200) having over 70% of iron is "fixed directly" to the magnet (190), adopting the structure with reduced inner diameter of the magnet (190). For a reference, in the case of conventional vibrational motor (10), the magnet (22) is disposed radially away from the bearing support (17) that encloses the bearing (18). As such, the inner and outer diameters of the magnet (22) cannot help but get large. According to the structure of the present invention, the outer diameter gets reduced as much as the inner diameter, and thus the volume of the weight can be increased. Also, since it is possible to provide more external space of the coils, the eccentricity amount of the rotor can be maximized by increasing the volume of the weight so that the weight takes up the external space of the coils.

The weight (20) of the conventional vibrational motor (10) engages with the back yoke (16) in a form of attaching on the bottom surface of the back yoke (16). In contrast, in the case of vibrational motor (100) of the invention, the two latching grooves (182a, 182b) and the two latching protrusions (212a, 212b) are provided on the weight (180) and the back yoke (210) respectively, and the weight (180) and the back yoke (210) engage with each other in a form that they interlock each other. The height of the weight (180) can be increased by the thickness of the back yoke (210). In other words, there is a room for the height of the weight (180) to be reduced by the thickness of the back yoke (210).

Also, as shown in FIGS. 9 and 10, the weight (180) forming the rotor has a structure providing the step (184) upside down on the bottom surface. Since the floor surface of the step (184) of the weight (180) is almost same as the magnet (190), it is same as the conventional vibrational motor (10) that the magnet (190) is enclosed by the weight (180). In the case of the conventional vibrational motor (10), since there is no space for a step (184) ("L" portion in the drawings) to be further provided, it is impossible to make the weight (20) larger. Usually, the thickness of the weight (20) cannot be thicker than the magnet (22) installed in the rotor. In contrast, in the case of vibrational motor (100) of the invention, the top surface of the weight (180) passes the top surface of the magnet (190) and extends to the top surface of the back yoke (210). In this respect, the volume of the weight (180) of the present invention is larger than that of the conventional vibrational motor (10).

Furthermore, the weight (180) of the present invention is configured to rotate while enclosing the external surface of the coils (150) forming the stator by the height L of the step (184) provided on the bottom surface. Therefore, the volume of the weight (180) can be enlarged by the portion forming the step (184). To increase the height of the weight (180) as such is not to cause the thickness of the vibrational motor (100) to increase. The weight (180) of the present invention makes its height higher, that is, by the height "L" of the step (184) than the prior art without causing the thickness of the vibrational motor (100) to increase. Therefore, the entire volume of the weight (180) can be made larger, and when the entire volume is maintained as before, the thickness of the vibrational motor (100) can be reduced.

The reason for these structural features obtainable is that the coils (150) can be disposed very closely to the shaft (160) that is a center of rotation by reducing the radial size through improving the assembling structure of the bearing (200) and the back yoke (210). If you have an intention to make the volume of the weight (180) be maintained as before, what to do is just to reduce the radial size of the weight (180). This means that it is possible to reduce the radial size of the vibrational motor (100).

According to the structure, the weight (180) gets larger in volume and can rotate around the external surface of the coils (150). By disposing the weight (180) at the farthest perimeter of the rotor, the eccentric distance of weight from the center of rotation gets larger, and much stronger vibration can be generated.

The rotor of the present invention is designed in an anti-shock structure. The detailed view "A" of FIG. 10 shows how the back yoke (210) and the bearing (200)

engage with each other in the anti-shock structure so as to prevent dislocating of the bearing (200) against external shock. If a shock is applied to the vibrational motor (100) from outside, the rotor moves up and down with respect to the shaft (160) as a reference and delivers the shock force to the bearing (200). If not withstanding the shock force, the bearing (200) is dislocated from the magnet (190).

In order to prevent such a problem, as shown in FIG. 10(b), on inclined surfaces of the through-hole provided in the center of the back yoke (210) and the bearing (200) are provided step portions, and then the step portions are configured to be interlocked with each other. That is, the step border of the central through-hole of the back yoke (210) engages so as to cover and press down the top edge of the bearing (200), preventing the bearing (200) from dislocating from the top of the rotor. By this, the problem can be prevented that under an external shock the bottom side of the bearing (200) receives the external shock and is dislocated toward the top side of the rotor.

On the contrary, with the external shock, the top surface of the bearing (200) of the rotor may have a contact friction with the sliding film (220) attached to the center of the case body (230). If the bearing (200) protrudes above the back yoke (210), the shock is concentrated on the bearing (200), so that the bearing (200) may be pushed downward. In order to compensate such a problem, the bearing (200) is engaged with the back yoke (210) and maintained so that the height of the top surface of the bearing (200) be same as or lower than the height of the surface of the back yoke (210). Then, the sliding film (220) has friction with the back yoke (210) and the bearing (200) concurrently or only with the back yoke (210). By this, the phenomenon can be prevented that the bearing (200) is pushed downward (a dislocation phenomenon).

INDUSTRIAL APPLICATIONS

Since the vibrational motor of the present invention has a structure for obtaining larger vibrational force with respect to the volume, it can be used in various applications in which miniaturization of vibrational motor is required. Especially, it is suitable for a user alarming means of small-sized electronic devices (for example, mobile electronic device such as a mobile phone), in which the installation space must be reduced.

[Description of Reference Numerals]

| | |
|---|---|
| 100: BLDC vibrational motor | 110: bracket |
| 120: double-sided tape | 130: PCB |
| 140: operating IC | 150: coil |
| 160: shaft | 170: washer |
| 180: weight | 190: magnet |
| 200: bearing | 210: back yoke |
| 220: sliding film | 230: case body |

What is claimed is:

1. A brushless direct current (BLDC) vibrational motor comprising:

a stator comprising: a bracket providing a circular floor plate having a circular protruding supporting portion provided at a center; a shaft having a lower portion press-fitted in and fixed to the circular protruding supporting portion; double-sided tape attached to the circular floor plate of the bracket; a plurality of coils attached and fixed on the double-sided tape and disposed around the shaft; and a printed circuit board installed with an operating IC having a Hall sensor, supplying operating current to the plurality of coils so as to make electromagnet, and attached and fixed on the double-sided tape, wherein the stator is fixed so as not to rotate;

a rotor comprising: a back yoke providing a circular plate having a through-hole at a center; a doughnut-shaped permanent magnet engaging with the circular plate of the back yoke solidly, such that its inner and outer radial edges are positioned directly above the plurality of coils, a radial extent of the doughnut-shaped permanent magnet being about the same as a radial extent of the plurality of coils, thereby increasing a facing area between the permanent magnet and the plurality of coils and enhancing a vibration function of the rotor, and interacting with magnetic fields generated by the plurality of coils and generating a rotational torque; a cylindrical bearing press-fitted in the inside of the permanent magnet to be engaged directly so as to minimize the outer diameter of the permanent magnet and, having a top portion inserted in the through-hole of the back yoke; and a weight being a circular-arc-shaped bar having a step for enabling a partial overlapping over the outside of the coils so as to enlarge the volume of the weight by the volume amount of the step on a bottom thereof, the weight engaging solidly with an edge portion of the circular plate of the back yoke, and extending downward so as to overlap an outside of the circular plate of the back yoke, an outside of the permanent magnet, and an outside of the coils, thereby increasing eccentric vibration, wherein the bearing is an oil-less bearing made of iron series having over 70% of the iron so that the bearing can shield flux of magnetic field from the permanent magnet from entering the shaft and thus block magnetic field interference, the bearing is inserted around the shaft and thus the rotor engages with the stator so as to rotate about the shaft as a central axis, and all of the back yoke, the permanent magnet, the bearing, and the weight vibrate and rotate integrally by the rotational torque generated by the permanent magnet and the eccentricity of the weight; and a case receiving an assembly of the stator and the rotor in an internal space provided by covering and engaging with the bracket and having a top end of the shaft inserted in a groove provided at a center thereof so as to hold the shaft stably, wherein the back yoke comprises an arc-shaped latching step, which is provided in a specific height along a portion of the edge of the circular plate, overlapping an external surface of the permanent magnet, so that when the rotor rotates the permanent magnet is supported and prevented from dislocating radially by the arc-shaped latching step, wherein the weight is formed with at least one latching groove on the top surface, the back yoke is provided with at least one latching protrusion extending radially from the edge of the circular plate along a remaining portion of the edge of the circular plate, and the at least one latching protrusion of the back yoke is inserted to the at least one latching groove of the weight to engage solidly, thereby maintaining the engagement between the weight and the back yoke even when the rotor rotates, and so that a portion of the top surface of the weight has at least the same height as the circular plate of the back yoke, and wherein a diameter of a portion of the bearing facing the plurality of coils is smaller than a diameter of a portion of the bearing engaging with the permanent magnet, and the plurality of coils are disposed within an annular recess defined by both the smaller diameter portion and the step of the weight.

2. The BLDC vibrational motor of claim 1, wherein in order to prevent the bearing from dislocating from a top of the rotor, a step is provided in each of the through-hole at the center of the back yoke and the top surface of the bearing, so that the back yoke engages with the bearing in a form that the step border of the through-hole of the back yoke covers and presses down on the top end edge of the bearing.

3. The BLDC vibrational motor of claim 1, further comprising a washer, which is inserted around a bottom portion of the shaft, supported by the cylindrical protruding supporting portion of the bracket, supporting the bearing lest the bearing be lowered below a specific height.

4. The BLDC vibrational motor of claim 1, wherein the bearing is combined to the back yoke so that the height of the top surface of the bearing can be maintained at the same height as or lower than the surface height of the back yoke.

5. The BLDC vibrational motor of claim 1, wherein the operating IC is packaged with a technology of a wafer level chip scale package (WLCSP) forming a bump terminal at an IC bare chip, so that an area of the IC chip is the same as an area of the entire package.

* * * * *